United States Patent [19]

Forwald et al.

[11] Patent Number: 4,986,971

[45] Date of Patent: Jan. 22, 1991

[54] METHOD FOR PRODUCTION OF TRICHLOROMONOSILANE

[75] Inventors: Karl Forwald, Kristiansand; Gunnar Schüssler, Drammen; Oyvind Sorli, Sewickley, all of Norway

[73] Assignee: Elkem a/s, Norway

[21] Appl. No.: 434,087

[22] Filed: Nov. 9, 1989

[30] Foreign Application Priority Data

Dec. 8, 1988 [NO] Norway ................................. 885454

[51] Int. Cl.$^5$ ...................... C01B 33/08; C01B 33/02; B29B 9/00
[52] U.S. Cl. ........................................ 423/342; 75/338; 264/12; 423/341; 423/343; 423/348; 423/349
[58] Field of Search ............... 423/341, 342, 343, 348, 423/349, 350; 75/0.5 C, 338; 264/12

[56] References Cited

U.S. PATENT DOCUMENTS 3,592,391 7/1971 Bender et al. ..................... 75/0.5 R
4,347,199 8/1982 Speier et al. ............................ 264/8
4,419,060 12/1983 Speier et al. ............................ 425/8

FOREIGN PATENT DOCUMENTS 652188 11/1962 Canada ................................. 423/342
3533964 1/1987 Fed. Rep. of Germany ........ 264/12
47-18406 5/1972 Japan ..................................... 264/12

OTHER PUBLICATIONS

Handbook of Chemistry and Physics, 54th edition, Ed. Weast, p. F-98.

*Primary Examiner*—John Doll
*Assistant Examiner*—Lori F. Cuomo
*Attorney, Agent, or Firm*—Lucas & Just

[57] ABSTRACT

The present application relates to a method for production of trichloromonosilane in a fluidized bed reactor by reaction of silicon powder and HCl at a temperature between 280° and 300° C. wherein silicon powder which has been produced by gas atomization of molten silicon is used. The gas atomized silicon powder has a preferred particle size between 1 and 1000 μm.

6 Claims, No Drawings

METHOD FOR PRODUCTION OF TRICHLOROMONOSILANE

The present invention relates to a method for production of trichloromonosilane, $HSiCl_3$.

Super-pure trichloromonosilane is used as a raw material for production of silicon transistors. Trichloromonosilane is produced by reaching silicon powder with hydrochloric acid gas (HCl-gas) in a fluidized bed reactor where HCl-gas is supplied to the reactor containing silicon powder at a temperature between about 280° C. and about 300° C. Trichloromonosilane which has a boiling point of 31.8° C. is separated from the product gas from the fluidized bed by condensation and is separated from other chlorosilanes by destillation.

An important parameter in the production of trichloromonosilane is the amount of non-reacted HCl-gas. The amount of non-reacted HCl-gas is very important cost factor for the process and the amount of non-reacted HCl-gas should be as low as possible. An increasing amount of non-reacted HCl-gas gives also an increasing amount of the unwanted by-product silicon tetrachloride ($SiCl_4$) in the product gas and thus lower the amount of produced trichloromonosilane. For production of trichloromonosilane silicon powder is used which has been produced by crushing and grinding of block cast silicon. Due to the low cooling rate which is obtained in block casting, alloying elements and impurities in block cast silicon show a strong tendency of segregation. During crushing and grinding a block cast silicon an inhomogeneous powder product is obtained which shows rather big differences in chemical composition between individual particles.

The quality and homogeneity of the silicon powder has a marked effect on the above described method for production of trichloromonosilane, and it has now been found that by using silicon powder which has been produced by gas atomizing of molten silicon, a surprisingly high utilization of HCl-gas is obtained in the method for producing trichloromonosilane by reaction of silicon powder with HCl-gas.

The present invention thus relates to a method for production of trichloromonosilane in a fluidized bed reactor by reaction of silicon powder with HCl-gas at a temperature between 280° C. and 300° C., which method are characterized in that the silicon charged to the reactor is produced by gas atomizing of molten silicon.

The silicon powder has a particle size between 1 and 1000 μm, preferably between 50 and 800 μm.

By the method according to the present invention the utilization of HCl in the process is considerably increased as the content of non-reacted hydrochloric acid (HCl) in the product gas is reduced from the conventional 5-10% to 2-3%. The reduction of the amount of non-reacted HCl also gives a reduced amount of produced by-products, above all $SiCl_4$. It has thus been found that the amount of produced $SiCl_4$ has been reduced by 3-5% by the method according to the present invention. This again gives a higher production of trichloromonosilane.

EXAMPLE

The following tests were carried out in a fluidized bed reactor having an internal diameter of 40 mm. In all tests the same amount of silicon having a particle size between 50 and 350 μm was used. HCl-gas at a pressure of 2 bar was supplied to the bottom of the reactor. The flow of HCl was kept constant during all the tests. After heating and initializing of the reaction, the reaction conditions were kept constant at 290° C. Under these conditions the HCl content of the product gas was measured.

Test A was carried out with silicon powder produced in conventional way by crushing and grinding. Test B was carried out with silicon powder produced by atomization of molten silicon by nitrogen.

The chemical composition of the silicon powders was as follows.

|    | Test A<br>% by weight | Test B<br>% by weight |
|----|-----------------------|-----------------------|
| Fe | 0.40                  | 0.35                  |
| Ca | 0.01                  | 0.05                  |
| Al | 0.47                  | 0.42                  |
| Ti | 0.02                  | 0.02                  |

It was found that the consumption of HCl for test A was 92%, while the consumption of HCl for test B was 98%. From this it is evident that a strongly increased yield of HCl is obtained by the method according to the present invention compared to the conventional method.

What is claimed:

1. A method for producing trichloromonosilane in a fluidized bed reactor by reaction wherein a silicon powder and gaseous hydrochloric acid are reacted at a temperature between 280° and 300° C., the improvement comprising using a silicon powder produced by gas atomization of molten silicon, whereby the amount of non-reacted hydrochloric acid and silicon tetrachloride produced during the reaction is reduced.

2. The method of claim 1 wherein the gas atomized silicon has a particle size between about 1 and about 1000 μm.

3. The method according to claim 1 wherein the gas atomized silicon has a particle size between about 50 and about 800 μm.

4. A method for producing trichloromonosilane comprising:
   (a) producing a silicon powder by gas atomization of molten silicon; and
   (b) reacting said silicon powder with gaseous hydrochloric acid in a fluidized bed reactor at a temperature between 280° and 300° C. to produce said trichloromonosilane.

5. The method of claim 4 wherein the gas atomized silicon has a particle size between about 1 and about 1000 μm.

6. The method of claim 4 wherein the gas atomized silicon has a particle size between about 50 and about 800 μm.

* * * * *